(12) United States Patent
Man et al.

(10) Patent No.: US 8,639,302 B2
(45) Date of Patent: Jan. 28, 2014

(54) ANTENNA SPACER FOR A HANDHELD COMMUNICATION DEVICE

(75) Inventors: Ying Tong Man, Waterloo (CA); Yihong Qi, St. Agatha (CA); Perry Jarmuszewski, Waterloo (CA); Dietmar Wennemer, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1122 days.

(21) Appl. No.: 11/773,415

(22) Filed: Jul. 4, 2007

(65) Prior Publication Data
US 2009/0011806 A1  Jan. 8, 2009

(51) Int. Cl.
*H04M 1/00* (2006.01)
(52) U.S. Cl.
USPC ............ 455/575.5; 455/575.1; 455/575.6; 455/90.3
(58) Field of Classification Search
USPC .............. 455/575.1–8, 90.3; 379/329, 429, 379/433.01, 437, 451; 343/702; 464/170
See application file for complete search history.

(56) References Cited

U.S. PATENT DOCUMENTS

| 5,778,062 | A |   | 7/1998 | Vanmoor |         |
|-----------|---|---|--------|---------|---------|
| 6,028,556 | A | * | 2/2000 | Shiraki | 343/702 |
| 6,459,916 | B1|   | 10/2002| Suguro  |         |
| 7,386,121 | B1| * | 6/2008 | Rivas   | 379/451 |

FOREIGN PATENT DOCUMENTS

| CN | 2384386     | Y  | 6/2000  |
| EP | 1679861     | A1 | 7/2006  |
| EP | 1816829     | A1 | 8/2007  |
| FR | 2799088     | A1 | 3/2001  |
| JP | 11-355412   |    | 12/1999 |
| JP | 2004-120644 |    | 4/2004  |
| JP | 2004-296129 |    | 10/2004 |
| JP | 2004-297535 |    | 10/2004 |
| JP | 2004-364331 |    | 12/2004 |
| KR | 2000/0005472|    | 1/2000  |

* cited by examiner

*Primary Examiner* — Marcos Torres
(74) *Attorney, Agent, or Firm* — McCarthy Tétrault LLP (57) ABSTRACT

The invention provides a portable communication device and enclosure therefor where separation of its antenna from the user's head is facilitated. The device comprises: a case; a speaker port; an antenna located in the bottom of the case; and a spacer located on the front of the case for resting against a cheek of a user of the device. When the device is held against the head of a user of the device with the spacer resting against a cheek of the user, the spacer biases the bottom of the device away from the user's head. The spacer may be located at a distance from the speaker port on the front of the case to comply with a Cellular Telephone Information Association (CTIA) test plan for Mobile Station Over the Air Performance.

18 Claims, 8 Drawing Sheets

ANTENNA SPACER FOR A HANDHELD COMMUNICATION DEVICE

FIELD OF INVENTION

The invention relates to an antenna spacer for a handheld communication device. In particular, it relates to spacer(s) and other physical feature(s) on the device that offset one end or part of the device from the user's head, which contains internal sensitive components. The performance of those components is improved when they are located at an increased distance from the user's head.

BACKGROUND

A voice communication device typically has a handheld (telephone) handset, which is an oblong body having a microphone port located at one (long) end of the body and a speaker port located at the opposite (long) end of the body. The handset is typically grasped in one hand about its middle and is placed against the user's head, such that the (long) end containing the microphone port is located near the user's mouth and the (long) end containing the speaker port is located near the user's ear. Handsets are used in wired and wireless communication devices, including residential telephone sets, portable telephones, cellphones, PDAs, walkie-talkies, Family Radio Service (FRS) communication devices and the like.

There is an ongoing trend to reduce the size of the form factor of a handset of a wireless device. As the form factor decreases in overall size and/or thickness, a tension increased between the layout of components in the handset and wireless transmissions performance. For a "small" and/or "thin" device, its antenna is necessarily physically located closer to the user's head when the device is used. The user's head creates a "phantom" obstruction which disturbs the antenna radiation pattern and increases signal loss of the antenna. This obstruction increases the closer the antenna is to the user's head. Additionally, signal reception/transmission performance is affected by the specific absorption rate (SAR) as the tissues in the head absorb radio frequency (RF) radiated power. Further still, if the device requires Hearing Aid Compatibility (HAC), the hearing aid unit may cause additional inferences to the device.

There is a need for an arrangement which addresses deficiencies in the prior art of positioning a communication device about a user's head.

BRIEF DESCRIPTION OF DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF AN EMBODIMENT

The description which follows and the embodiments described therein are provided by way of illustration of an example or examples of particular embodiments of the principles of the present disclosure. These examples are provided for the purposes of explanation and not limitation of those principles and of the invention. In the description which follows, like parts are marked throughout the specification and the drawings with the same respective reference numerals.

In a first aspect, a portable communication device is provided. The device comprises: a case; a speaker port; an antenna located in the bottom of the case; and a spacer located on the front of the case for resting against a cheek of a user of the device. When the device is held against the head of a user of the device with the spacer resting against a cheek of the user, the spacer biases the bottom of the device away from the user's head.

In the device, the spacer may be located at between 30 mm and 60 mm from the speaker port on the front of the case; and the spacer may have a height rising above the case of between 0.5 mm to 5 mm.

In the device, the spacer may be located at a distance from the speaker port on the front of the case to comply with a Cellular Telephone Information Association (CTIA) test plan for Mobile Station Over the Air Performance.

The device may further comprise: a display; and a cover for the display. Therein, the spacer may be integrated with the cover and may span a section across the bottom of the cover. Alternatively, the spacer may be attached to the cover and may span a section across the bottom of the cover.

The device may further comprise a roller ball located on the front of the case, where the spacer is shaped to surround at least a part of the rollerball and the spacer is mounted on the face of the case. In the device, the spacer may form a ring around the roller ball.

In the device, the spacer may be integrated with the case and may be located below a display in the case.

In the device, the spacer may be retractable to a first position within said case and deployable to a second position where it projects from the front of said case.

In a second aspect, an enclosure for a portable communication device is provided. The enclosure comprises: a case; a first opening in said case providing a speaker port; a second opening in said case for a display; and a spacer located on the front of the case for resting against a cheek of a user of the device. When the enclosure is held against the head of a user of the enclosure with the spacer resting against a cheek of the user, the spacer biases the bottom of the device away from the user's head.

In the enclosure, the spacer may be located at between 30 mm and 60 mm from the speaker port on the front of the case; the spacer may have a height rising above the case of between 0.5 mm to 5 mm; and said case may have a thickness of between 10 mm and 20 mm.

In the enclosure, the spacer may be located at a distance from the speaker port on the front of the case to comply with a Cellular Telephone Information Association (CTIA) test plan for Mobile Station Over the Air Performance.

The enclosure may further comprise a cover for the second opening for the display, wherein the spacer is integrated with the cover and may span a section along the bottom of the cover. Alternatively, the spacer may be attached to the cover and may span a section along the bottom of the cover.

The enclosure may further comprise a third opening for a roller ball on the front of the case, wherein the spacer may be shaped to surround at least a part of the third opening and the spacer may be mounted on the face of the case. The spacer may additionally form a ring around the third opening.

In the enclosure, the spacer may be integrated with the case and may span across a width of the case below the second opening.

In the enclosure, the spacer may be retractable to a first position within said case and deployable to a second position where it projects from the front of said case.

In other aspects various combinations of sets and subsets of the above aspects are provided.

Figure 1:
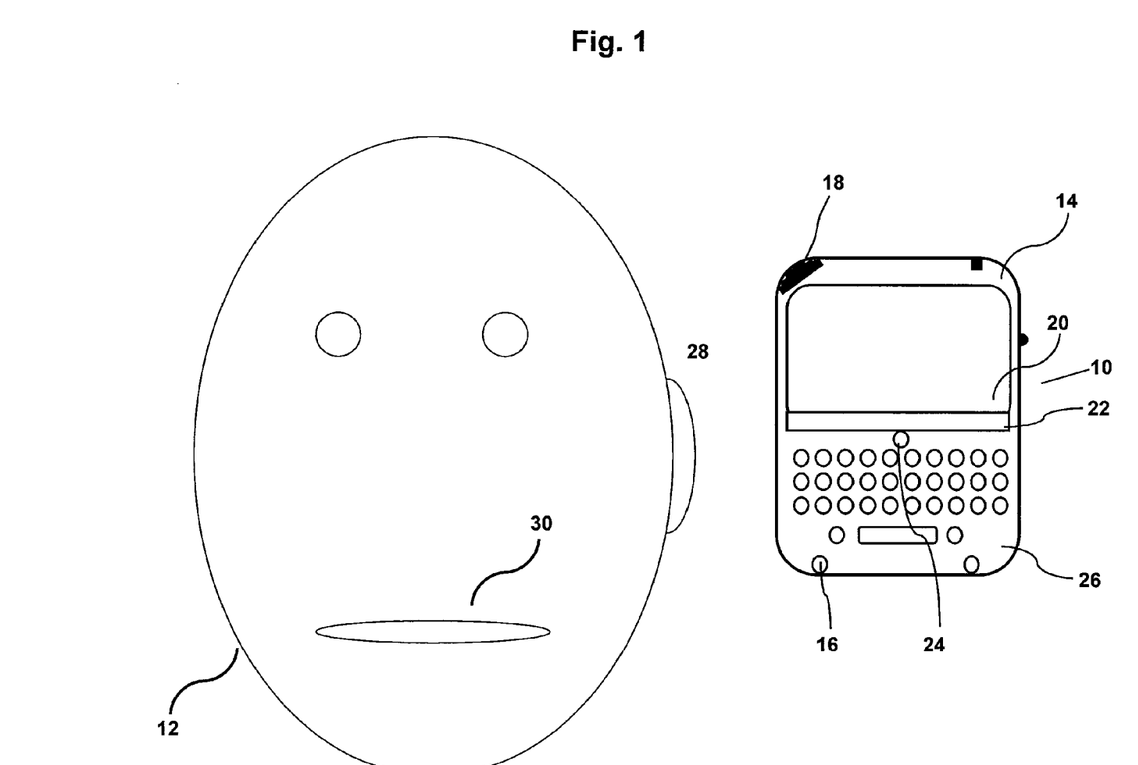
FIG. 1 is a schematic representation of a portable electronic device having in accordance with an embodiment shown in situ about a user's head.
Figure 2:
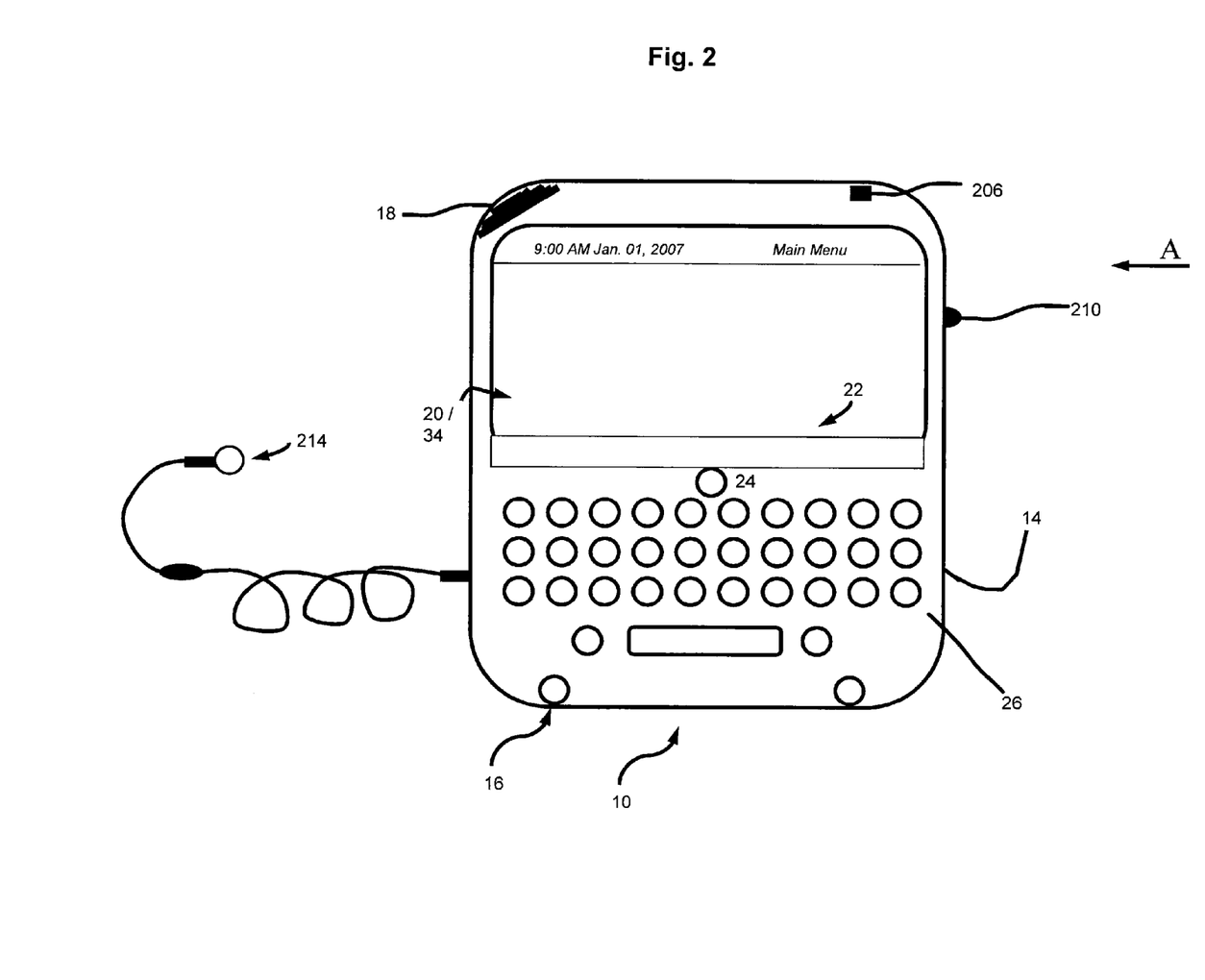
FIG. 2 is a block diagram of the form factor of the device of FIG. 1.

Referring to FIGS. 1 and 2, portable communication device 10 is shown being used by user 12. Device 10 may be a wireless handheld device, a cellphone, a PDA, or any wireless handset. Device 10 has a generally oblong shaped form factor in case 14 with a microphone port 16 at a lower end and a speaker port 18 at an upper end. It will be understood that case 14 can be made from any suitable material as will occur to those of skill in the art and may be suitably formed to house and hold all components of device 10. Display 20 provides visual information on the status of device 10 to the user. There is typically a transparent or translucent cover 34 or lens that is provided to cover the actual display 20 that is mounted into an opening in case 14 for display 20. Spacer 22 provides, according to an embodiment, additional ledge or spacer for device 10 to separate a portion of device 10 from user 12. Device 10 also has rollerball 24 and keypad 26. In use, device 10 is held against the side of user's 12 head, such that speaker port 18 is located at or near ear 28 of user 12 and microphone port 16 is located near mouth 30. An internal antenna (not shown) is provided in device 10 allowing device 10 to receive and transmit radio frequency (RF) signals to external devices. The case forms at least part of an enclosure for the device 10. Typically, case 14 has a thickness of approximately 10-20 mm and its antenna is located in the bottom portion of case 14, towards the back end.

For the purpose of providing a set of convenient reference directions and not limitation, the "top" of device 10 refers to the upper part of device 10 (generally being the part where display 20 is located), while the "bottom" of device 10 refers to the lower part of device 10 (generally being where microphone port 16 is located). The "front" of device 10 refers to the face of device 10 (generally being the face where display 20 and keypad 26 are located), while the "back" of device 10 refers to the rear of device 10 (generally being the back case of case 14).

FIG. 2 provides general features of electronic device 10 for receiving electronic communications in accordance with an embodiment. Electronic device 10 is based on a computing platform having functionality of an enhanced personal digital assistant with cellphone and e-mail features. It is, however, to be understood that electronic device 10 can be based on construction design and functionality of other electronic devices, such as smart telephones, desktop computers, pagers or laptops having telephony equipment. Device 10 is operable to conduct wireless telephone calls, using any known wireless phone system such as a Global System for Mobile Communications (GSM) system, Code Division Multiple Access (CDMA) system, Wideband CDMA/UMTS, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls.

Figure 3:
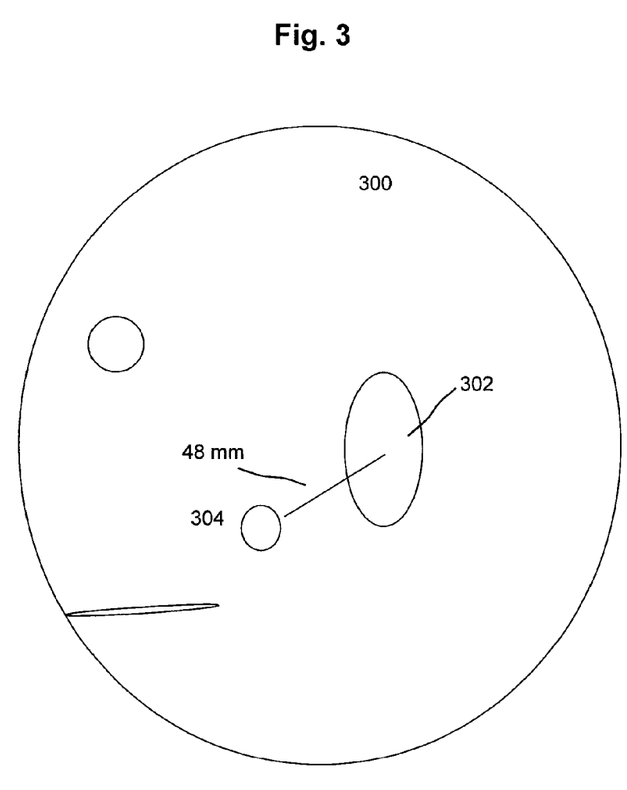
FIG. 3 is a schematic representation of a side view of a test fixture representing the user's head of FIG. 1 showing measurement dimensions associated with the device of FIG. 1.

Referring to FIG. 3, test fixture 300 represents a typical user's head (such as head 12) and is formed as a three-dimensional to-scale form. Fixture 300 is used to test operational aspects of device 10, when device 10 is "held" in a "typical" operating orientation against fixture 300. According to a Cellular Telephone Information Association (CTIA) test plan for Mobile Station Over the Air Performance, device 10 is deemed to have two contact points with fixture 300. The first contact point is with ear feature 302 on test fixture 300. Generally, case 14 would contact this first area at the location of speaker port 18. The second contact point 304 is at the notional cheek on fixture 300. Generally, case 14 would contact the second point 48 mm downward from speaker port 18. The distance between the cheek contact point 304 and the ear contact point 302 is 48 mm under CTIA standards. This distance is used as part of a measurement of radio frequency transmissions attenuations encountered by the antenna in device 10. The CTIA fixture 300 has been adopted by many telephone carriers as a de facto standard for measuring testing environments for a wireless handset device.

As noted earlier, there are performance issues with an antenna in a device, such as device 10, when antenna is located close to the user's head. Its performance in situ degrades from an open-air transmission environment because the proximity of the user's head to device 10 interferes with the receipt and transmission of radio frequency signals to and from device 10. The lossy fluid in the organic tissue in the head contributes to this interference. One technique to improve the performance is to increase the distance between the antenna and the head.

To facilitate physical separation of an antenna in device 10 from the user's head, an embodiment provides spacer 22 as a physical feature on case 14 of device 10. Spacer 22 is protrusion extending from the front surface case 14 at an area along its front face. Spacer 22 is preferably positioned along the front surface of device 10 such that the exterior end of spacer 22 provides the point of contact for device 10 with the second contact point 304 on fixture 300 (FIG. 3). As such, spacer 22 is located approximately 48 mm from the center of speaker opening 18. It will be appreciated that in other embodiments, the distance may vary, such as between 24 mm to 72 mm. It can be seen that spacer 22 acts as a fulcrum to case 14 with speaker opening 18, which biases the bottom of case 14 away from the head of the user.

Figure 4:
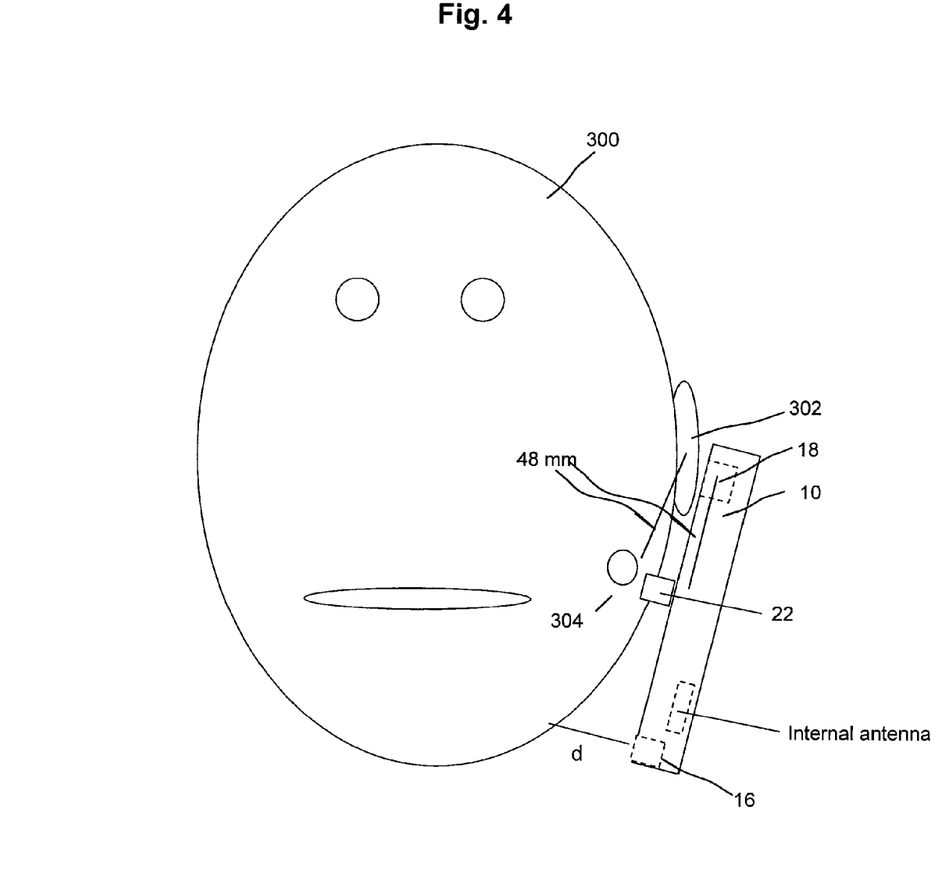
FIG. 4 is a schematic representation of a front/side profile view of the test fixture and device of FIG. 3.

Referring to FIGS. 3 and 4, schematic 400 shows device 10 being held in situ against the fixture 300 of FIG. 3. As shown, the upper end of device 10 having speaker port 18 rest near ear 28 of fixture 300. Spacer 22 rises from the base of device 10 provides a second contact point for the placement of device 10 such that spacer 22 contacts cheek location 304 on fixture 300. The distance between the spacer 22 (resting against contact location 304 area) and ear 302 is approximately 48 mm. As such, the lower end of device 10 is naturally canted away from the mouth of fixture 300. As such, when the antenna is located in the lower portion of device 10, it is further distanced from fixture 300. The distance of the separation d will depend on the overall length of device 10, the height of spacer 22, and location of spacer 22 along case 14. It has been observed that a gain of 1 dB is provided for every millimetre in which the antenna is located further away from lossy elements such as head 12. Improved radiated performance with respect to the height of the spacer depends on the antenna design and the mechanical design. The improvement range may be from 0.25 dB to 3 dB.

Figure 6:
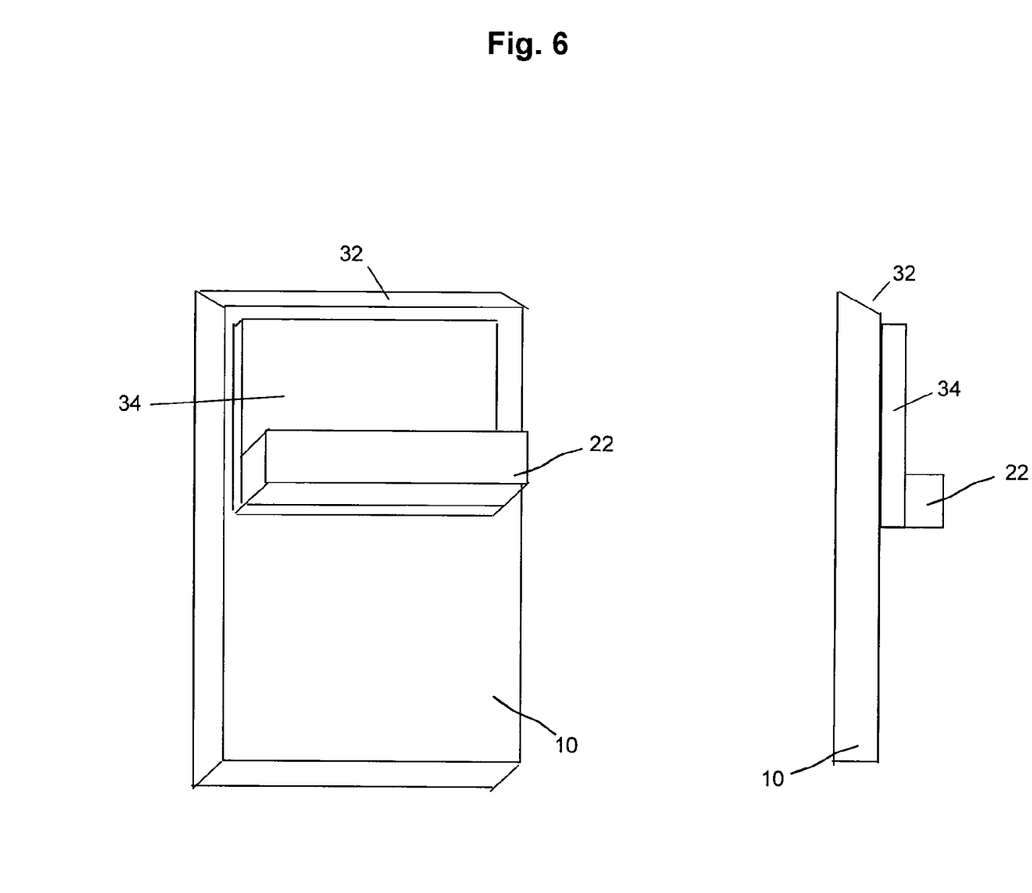
FIG. 6 is a representative (not to scale) side and front view of the case and the spacer of the device of FIG. 1.

Referring to FIG. 6, spacer 22 is shown as an oblong bar that laterally spans across the front section of device 10 and is part of cover 34. Spacer 22 is located at the bottom end of cover 34 for display 20. In one embodiment, spacer 22 has a height of approximately 1 mm extending above case 14 and may be in the range of 0.5 mm to 10 mm or more. Spacer 22 may span across the entire the front face of case 14 or a portion of its face. The width of spacer 22 may be any suitable dimension, according to available real estate on the face of case 14, but may be in the range of 1 mm to 10 mm or more. In this embodiment, case 14 also has notch 32 in its top end to provide another structural feature on case 14 to achieve or augment the displacement of d as shown in FIG. 4.

It will be appreciated that spacer 22 may be implemented in almost any form and shape and be located various suitable locations on case 14 to enlarge the separation of the antenna from fixture 300 (or equivalently from user's head). In other embodiments, spacer 22 may be placed at a location on case 14 which does not abide by the 48 mm distance from the speaker port 18. Spacer 22 may be mounted on cover 34 for display 20 at the bottom end of the cover. Alternatively, spacer 22 may be integrated into cover 34 for display 20. It will be appreciated that in other embodiments, any type of physical feature that protrudes from the case of device 10 whether affixed or incorporated therein to the case of device 10 may be provided to achieve the spacing of distance d as shown in FIG. 4.

Figure 7:
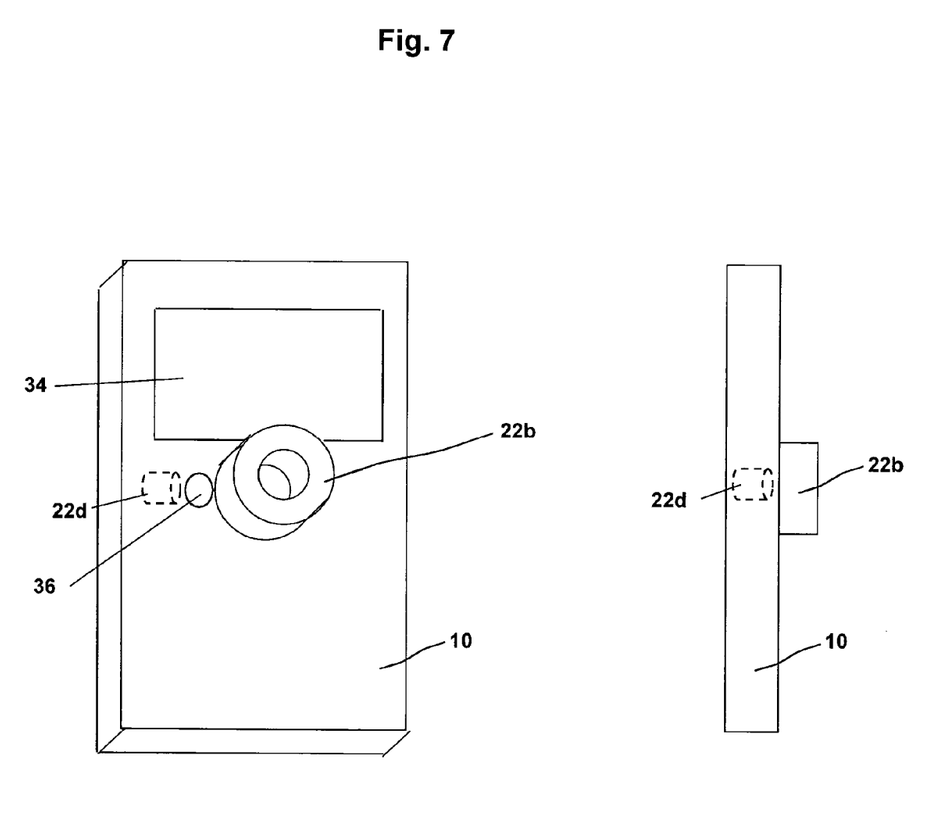
FIG. 7 is a representative (not to scale) side and front view of a case and a spacer of another embodiment of the device of FIG. 1.
Figure 8:
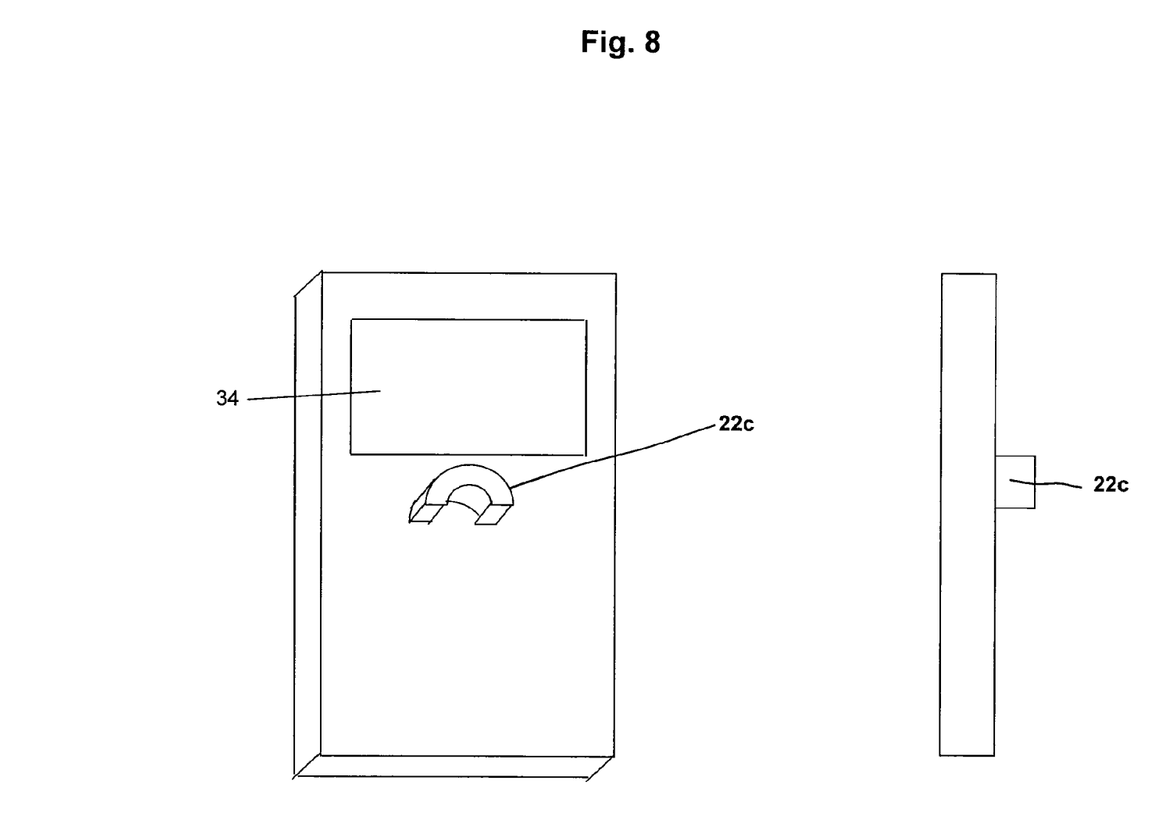
FIG. 8 is a representative (not to scale) side and front view of a case and a spacer of yet another embodiment of the device of FIG. 1.

For example, referring to FIG. 7 in another embodiment spacer 22b is implemented as an annular ring which is located around rollerball 24 (not shown). Referring to FIG. 8, in yet another embodiment spacer 22c is embodied as a semi-annular ring which covers the top portion of roll ball 24 (not shown). Again, spacers 22b and 22c have a height extending from the base of device 10 upwardly of approximately 1 mm. The size of the radius and the thickness of the rings in FIGS. 7 and 8 may be matched to the size of rollerball 26. However, exemplary dimensions would have an interior radius of between 0.5 mm to 10 mm and an exterior radius of between 0.7 mm to 20 mm.

It will be appreciated that spacer 22 may be a separate component module or formed feature that is affixed to case 14 of device 10. Further, the spacer may be affixed to any other component or area of device 10.

In other embodiments, there may be a series of spacers 22 provided at different locations on device 10. Each spacer may be a different shape, size and height to allow its placement at its given location and to facilitate the canting of the bottom end of device 10 away from the user's head.

In other embodiments, one or more of the spacers 22 may be selectively attached and removed from device 10 by the user. Spacers 22 may interact and connect with case 14 of device 10 via a mechanical, friction fit, binding fit, (releasable) clamp, adhesive or other attachment mechanism known in the art. For example a feature on the underside of a spacer 22 (such as a downwardly extending post) may mate and (releasably) lock with a mating feature at the target location on case 14 (such as a suitably sized hole to receive the post and tightly engage its sides to provide a friction fit). The feature can be interchanged between the spacer and case 14 as required. Further, than one mechanism to attach the spacer 22 to case 14 can be provided.

In another embodiment, a spacer may be retractable into case 14. For example, in FIG. 7 spacer 22d may be implemented as a rod which is moveable from a first "rest" position where it lies flat against (or within) case 14 and can be moved to a second "deployed" position, where it extends upward from the surface of case 14 through opening. Spacer 22d may be recessed into case and may be selectively deployed and stored through a spring-loaded mechanism. Alternatively or additional, the spacer may be rotatably fastened at one end to case 14 with a hinge or a similar fastening mechanism allowing rotation of the spacer.

In another embodiment, spacer 22 may be adjustable to provide different extension heights. Additionally or alternatively, spacer 22 may be formed to allow a spacer extension to be affixed to the top of its surface using glue, double sided adhesive tape or other affixing means. The extension may be affixed in any manner described herein or any other manner known to a person of skill in the art. Additional extensions may be affixed to the extension itself. The extensions can be any suitable shape or size, including platforms, poles, pegs, etc.

Figure 5:
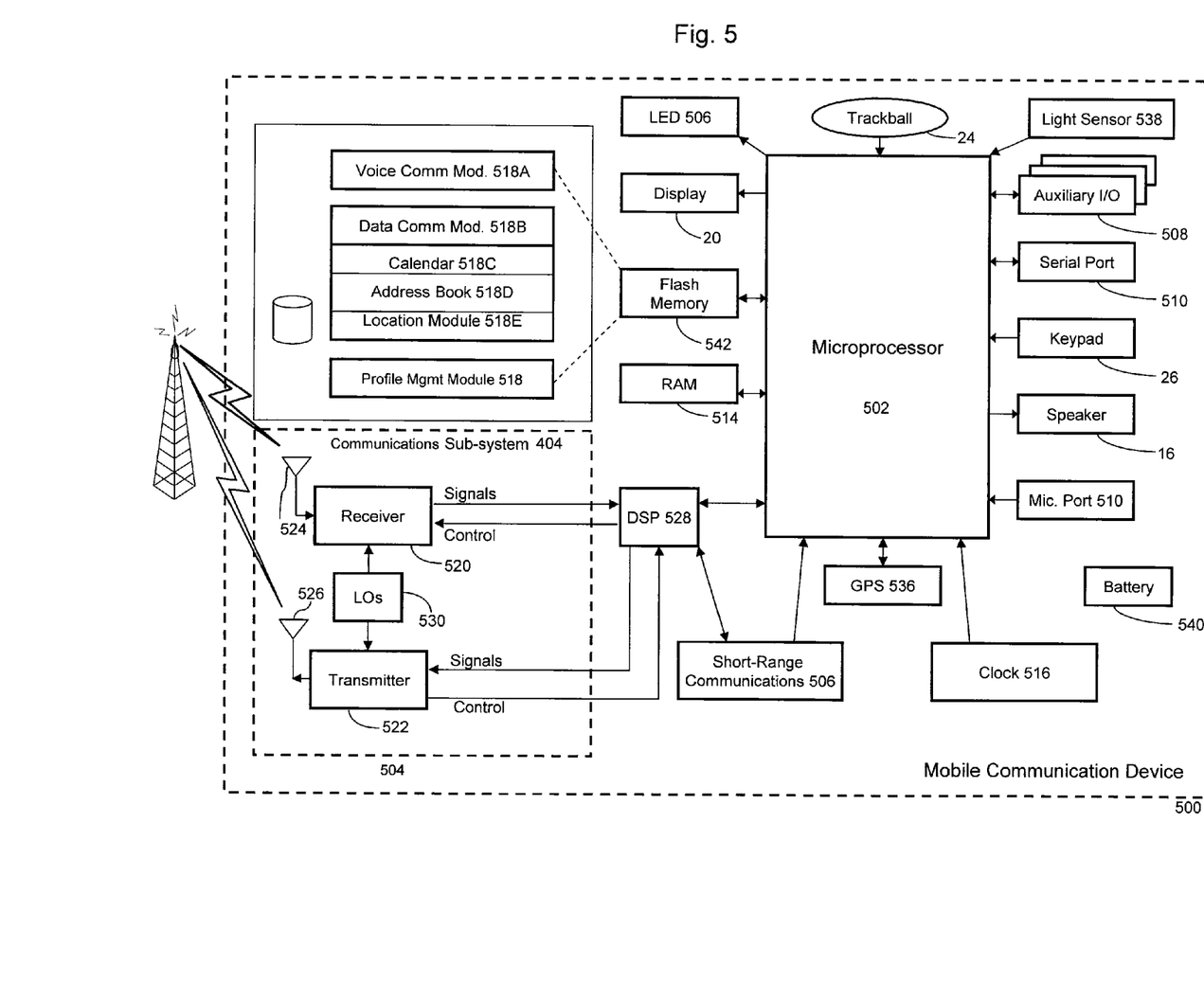
FIG. 5 is a block diagram of internal components of the device of FIG. 1.

Referring to FIG. 5, functional components of device 10 are provided in schematic 500. The functional components are generally electronic, structural or electromechanical devices. In particular, microprocessor 502 is provided to control and receive almost all data, transmissions, inputs and outputs related to device 10. Microprocessor 502 is shown schematically as coupled to keypad 26 and other internal devices. Microprocessor 502 preferably controls the overall operation of the device 10 and its components. Exemplary microprocessors for microprocessor 502 include Data 950 (trade-mark) series microprocessors, the 6200 series microprocessors and the PXA900 series of microprocessors, all available at one time from Intel Corporation. Microprocessor 502 is connected to other elements in device 10 through a series of electrical connections to its various input and output pins. Microprocessor 502 has an IRQ input line which allows it to receive signals from various devices. Appropriate interrupt firmware is provided which receives and reacts to the signals detected on the IRQ line. Microprocessor 502 may operate in several power modes, including a "normal" mode and a low-power mode.

In addition to the microprocessor 502, other internal components of the device 10 are shown schematically in FIG. 5. These include: display 20; speaker 18; keypad 26; communication sub-system 504; short-range communication sub-system 506; auxiliary I/O devices 508; microphone port 510 for microphone 16; flash memory 512 (which provides persistent storage of data); random access memory (RAM) 514; clock 516 and other device sub-systems (not shown). Device 10 is preferably a two-way radio frequency (RF) communication device having voice and data communication capabilities. In addition, device 10 preferably has the capability to communicate with other computer systems via the Internet.

Operating system software executed by the microprocessor 502 is preferably stored in a computer-readable medium, such as flash memory 512, but may be stored in other types of memory devices, such as read-only memory (ROM) or similar storage element. In addition, system software, specific device applications, or parts thereof, may be temporarily loaded into a volatile store, such as RAM 514. Communication signals received by device 10 may also be stored to RAM 514.

Microprocessor 502, in addition to its operating system functions, enables execution of software applications on device 10. A set of software (or firmware) applications, generally identified as applications 518, that control basic device operations, such as voice communication module 518A and data communication module 518B, may be installed on the device 10 during manufacture or downloaded thereafter. As well, software modules, such as calendar module 518C, address book 418D and location module 518E. Additional modules such as personal information manager (PIM) application may be provided. Any module may be installed during manufacture or downloaded thereafter into device 10. Data associated with each application can be stored in flash memory 512.

Communication functions, including data and voice communications, are performed through the communication sub-system 504 and the short-range communication sub-system 506. Systems 504 and 506 may be selectively activated and not activated depending on the current state of device 10. For example, if device 10 is in a low-power mode, then either or both of systems 504 and 506 may be not activated. Activation of both systems 504 and 506 may be controlled by software, including any module 518. Collectively, sub-systems 504 and 506 provide the signal-level interface for all communication technologies processed by device 10. Various applications 518 provide the operational controls to further process and log the communications. Communication sub-system 504 includes receiver 520, transmitter 522 and one or more antennas, illustrated as receive antenna 524 and transmit antenna 526. Antenna 524 and 526 are located within device 10 and are the components which may benefit from being distanced further from the user's head. In many embodiments, antenna 524 and 526 are located in the bottom portion of case 14, preferably towards the back of device 10.

In addition, communication sub-system 504 also includes processing modules, such as digital signal processor (DSP) 528 and local oscillators (LOs) 540. The specific design and implementation of communication sub-system 504 is dependent upon the communication network in which device 10 is intended to operate. For example, communication sub-system 504 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 10. In any event, communication sub-system 504 provides device 10 with the capability of communicating with other devices using various communication technologies, including instant messaging (IM) systems, text messaging (TM) systems and short message service (SMS) systems.

In addition to processing communication signals, DSP 528 provides control of receiver 520 and transmitter 522. For example, gains applied to communication signals in receiver 520 and transmitter 522 may be adaptively controlled through automatic gain-control algorithms implemented in DSP 528.

In a data communication mode, a received signal, such as a text message or Web page download, is processed by the communication sub-system 504 and is provided as an input to microprocessor 502. The received signal is then further processed by microprocessor 502 which can then generate an output to display 20 or to an auxiliary I/O device 508. A device user may also compose data items, such as e-mail messages, using keypad 26, trackball 24 and/or some other auxiliary I/O device 508, such as a touchpad, a rocker switch, a trackball or some other input device. The composed data items may then be transmitted over a communication network via communication sub-system 504. Sub-system 504 may also detect when it is out of communication range for its remote systems.

In a voice communication mode, overall operation of device 10 is substantially similar to the data communication mode, except that received signals are output to speaker 18, and signals for transmission are generated by microphone 16. Alternative voice or audio I/O sub-systems, such as a voice message recording sub-system, may also be implemented on device 10. In addition, display 20 may also be utilized in voice communication mode, for example, to display the identity of a calling party, the duration of a voice call, or other voice call-related information.

Short-range communication sub-system 506 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices.

Device 10 may also have global positioning system 536 to assist in identifying a present location of device 10 and may also have light sensor 538 to provide data on the ambient light conditions for device 10. These elements may be controlled by software operating on device 10 as described earlier.

Powering the entire electronics of the mobile handheld communication device is power source 540. In one embodiment, the power source 540 includes one or more batteries. In another embodiment, the power source 540 is a single battery pack, especially a rechargeable battery pack. A power switch (not shown) provides an "on/off" switch for device 10. A power source interface (not shown) may be provided in hardware, firmware, software or a combination of such elements to selectively control access of components in device 10 to power source 540. Upon activation of the power switch an application 518 is initiated to turn on device 10. Upon deactivation of the power switch, an application 518 is initiated to turn off device 10. Power to device 10 may also be controlled by other devices and by software applications 518.

It will be appreciated that a portable communication device of an embodiment may be a headset having an antenna that is in communication with a base station, such as a residential telephone.

The present invention is defined by the claims appended hereto, with the foregoing description being merely illustrative of embodiments of the invention. Those of ordinary skill may envisage certain modifications to the foregoing embodiments which, although not explicitly discussed herein, do not depart from the scope of the invention, as defined by the appended claims.

The invention claimed is:

1. A portable communication device comprising:
   a case having a top portion, a bottom portion and a front
   a speaker port located on the top portion of the case on the front of the case;
   an antenna located in the bottom portion of the case in a spaced relationship to the speaker port; and
   a spacer located on the front of the case at between 30 mm and 60 mm from the speaker port on the front between the speaker port in the top portion and the antenna in the bottom portion; spanning across the front of the case and having a height rising above the case of between 0.5 mm and 5 mm, the spacer providing a fulcrum for the device to locate the antenna in a spaced relationship away from a user's head when the portable communication device is held against the user's head with an ear of the user placed against the speaker port and the spacer resting against a cheek of the user's head to increase a distance of the antenna from lossy elements in the user's head while maintaining contact of the ear to the speaker.

2. The portable communication device as claimed in claim 1, wherein the spacer is located 48 mm from the speaker port to comply with a Cellular Telephone Information Association (CTIA) test plan for Mobile Station Over the Air Performance.

3. The portable communication device as claimed in claim 1, further comprising:
a display; and
a cover for the display,
wherein the spacer is integrated with the cover and spans a section across a bottom of the cover.

4. The portable communication device as claimed in claim 1, further comprising:
a display; and
a cover for the display,
wherein the spacer is attached to the cover and spans a section across a bottom of the cover.

5. The portable communication device as claimed in claim 1, further comprising a roller ball located on the front of the case, wherein the spacer is shaped to surround at least a part of the rollerball and the spacer is mounted on the front of the case.

6. The portable communication device as claimed in claim 1, wherein the spacer is integrated with the case and is located below a display in the case.

7. The portable communication device as claimed in claim 1, wherein the spacer is retractable to a first position within the case and a deployable second position where it projects from the front of the case.

8. The portable communication device as claimed in claim 1, wherein the case further comprises a notch formed along the top edge of the its top portion to increase the distance of the spaced relationship of the antenna from the user's head when the device is held against the head of the user of the device with the ear of the user placed against the speaker port and the spacer resting against the cheek of the user's head.

9. An enclosure for a portable communication device, comprising:
a case having a top portion, a bottom portion and a front, the case housing an antenna located in the bottom portion of the case;
a first opening on the front of the case providing a speaker port;
a second opening in the front of the case for a display; and
a spacer located on the front of the case at between 30 mm and 60 mm from the, speaker port between the speaker port in the top portion and the antenna in the bottom portion, spanning across the front of the case in a middle portion of the front and having a height rising above the case of between 0.5 mm and 5 mm, the spacer providing a fulcrum for the device to locate the antenna in a spaced relationship away from a user's head of the device when the portable communication device is held against the user's head with an ear of the user placed against the speaker port and the spacer resting against a cheek of the user's head to increase a distance of the antenna from lossy elements in the user's head while maintaining contact of the ear to the speaker port.

10. The enclosure for a portable communication device as claimed in claim 9, wherein:
the speaker port is located in the top portion of the case; and
the case has a thickness of between 10 mm and 20 mm.

11. The enclosure for a portable communication device as claimed in claim 10, wherein the spacer is located 48 mm from the speaker port to comply with a Cellular Telephone Information Association (CTIA) test plan for Mobile Station Over the Air Performance.

12. The enclosure for a portable communication device as claimed in claim 10, further comprising a cover for the second opening for the display, wherein the spacer is integrated with the cover and spans a section along a bottom of the cover.

13. The enclosure for a portable communication device as claimed in claim 10, further comprising a cover for the second opening for the display, wherein the spacer is attached to the cover and spans a section along a bottom of the cover.

14. The enclosure for a portable communication device as claimed in claim 10, further comprising a third opening for a roller ball on the front of the case, wherein the spacer is shaped to surround at least a part of the third opening and the spacer is mounted on the front of the case.

15. The enclosure for a portable communication device as claimed in claim 14, wherein the spacer forms a ring around the third opening.

16. The enclosure for a portable communication device as claimed in claim 10, wherein the spacer is integrated with the case and is spans across a width of the case below the second opening.

17. The enclosure for a portable communication device as claimed in claim 10, wherein the spacer is retractable to a first position within the case and deployable to a second position where it projects from the front of the case.

18. The enclosure for a portable communication device as claimed in claim 9, wherein the case further comprises a notch formed along the top edge of the top portion to increase the distance of the spaced relationship of the antenna from the user's head when the device is held against the head of the user of the device with the ear of the user placed against the speaker port and the spacer resting against the cheek of the user's head.

* * * * *